(12) United States Patent
Grieves et al.

(10) Patent No.: US 8,725,743 B2
(45) Date of Patent: May 13, 2014

(54) ACCESSIBLE COMMANDING INTERFACE

(75) Inventors: Jason Anthony Grieves, Redmond, WA (US); Nicholas Wrem, Seattle, WA (US); Paul James Reid, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 82 days.

(21) Appl. No.: 13/081,701

(22) Filed: Apr. 7, 2011

(65) Prior Publication Data

US 2012/0259868 A1 Oct. 11, 2012

(51) Int. Cl.
*G06F 17/30* (2006.01)

(52) U.S. Cl.
USPC .......................................... 707/752; 717/125

(58) Field of Classification Search
USPC ................. 707/5, 723, 101, 728, 102, 767, 2; 713/200; 717/125
See application file for complete search history.

(56) References Cited

U.S. PATENT DOCUMENTS

| | | | | |
|---|---|---|---|---|
| 6,101,482 | A * | 8/2000 | DiAngelo et al. | 705/26.62 |
| 6,389,491 | B1 * | 5/2002 | Jacobson et al. | 710/62 |
| 7,031,961 | B2 * | 4/2006 | Pitkow et al. | 1/1 |
| 7,089,237 | B2 * | 8/2006 | Turnbull et al. | 1/1 |
| 7,310,776 | B2 * | 12/2007 | Mansell et al. | 715/744 |
| 7,451,455 | B1 * | 11/2008 | El-Haj | 719/320 |
| 7,567,982 | B2 * | 7/2009 | Basner | 1/1 |
| 7,844,603 | B2 * | 11/2010 | Lucovsky et al. | 707/728 |
| 7,890,318 | B2 * | 2/2011 | Castellani et al. | 704/9 |
| 7,900,228 | B2 * | 3/2011 | Stark et al. | 725/45 |
| 8,280,913 | B2 * | 10/2012 | Bergin | 707/793 |
| 2003/0011641 | A1 | 1/2003 | Totman et al. | |
| 2003/0037048 | A1 * | 2/2003 | Kabra et al. | 707/4 |
| 2003/0105746 | A1 * | 6/2003 | Stickler | 707/3 |
| 2004/0098405 | A1 * | 5/2004 | Zrubek et al. | 707/103 R |
| 2005/0060564 | A1 * | 3/2005 | Murakami et al. | 713/200 |
| 2005/0080807 | A1 * | 4/2005 | Beilinson et al. | 707/102 |
| 2005/0104859 | A1 | 5/2005 | Need et al. | |
| 2006/0005132 | A1 | 1/2006 | Herdeg, III | |
| 2007/0038591 | A1 * | 2/2007 | Haub et al. | 707/1 |
| 2007/0130112 | A1 * | 6/2007 | Lin | 707/2 |

(Continued)

OTHER PUBLICATIONS

Harris, Kip, "Challenges and Solutions for Screen Reader / I.T. Interoperability", Retrieved at << http://www.sigaccess.org/community/newsletter/june_2006/jun06_02.pdf >>, ACM SIGACCESS Accessibility and Computing, Jun. 2006, p. 10-20.

(Continued)

*Primary Examiner* — James Trujillo
*Assistant Examiner* — Thong Vu
(74) *Attorney, Agent, or Firm* — Tony Azure; Raghu Chinagudabha; Micky Minhas (57) ABSTRACT

A commanding interface can provide an efficient computer interface for users of assistive technology by focusing on the tasks that an application can perform, rather than on the interface the application exposes. The commanding interface can provide a search mechanism that searches for and presents functions or functionality in response and dynamically updates results as the search query is entered. Additionally, the commanding interface can prioritize search results based on contextual data, including prior search terms, prior actions, and the context of the user's interaction with the application program. The commanding interface can enable the user to filter the functions and functionality presented through the commanding interface according to types of user-performed activities for which such functions would be utilized, patterns, or heuristically determined associations.

20 Claims, 4 Drawing Sheets

(56) References Cited

U.S. PATENT DOCUMENTS

| | | | |
|---|---|---|---|
| 2007/0143327 A1* | 6/2007 | Rivas et al. | 707/101 |
| 2008/0065617 A1* | 3/2008 | Burke et al. | 707/5 |
| 2008/0098332 A1 | 4/2008 | LaFrance-Linden et al. | |
| 2009/0063440 A1* | 3/2009 | Chacon | 707/4 |
| 2009/0228825 A1 | 9/2009 | Van Os et al. | |
| 2010/0049692 A1* | 2/2010 | Astito et al. | 707/2 |
| 2011/0010376 A1* | 1/2011 | Kawauchi | 707/758 |
| 2011/0161797 A1* | 6/2011 | Dewar et al. | 715/234 |
| 2011/0191364 A1* | 8/2011 | LeBeau et al. | 707/767 |
| 2012/0047130 A1* | 2/2012 | Perez et al. | 707/723 |
| 2012/0198547 A1* | 8/2012 | Fredette et al. | 726/19 |

OTHER PUBLICATIONS

Brunet, et al., "Accessibility requirements for systems design to accommodate users with vision impairments", Retrieved at << http://citeseerx.ist.psu.edu/viewdoc/download?doi=10.1.1.83.5947&rep=rep1&type=pdf >>, IBM Systems Journal, vol. 44, No. 3, 2005, p. 445-466.

"VEDICS", Retrieved at << http://sourceforge.net/projects/vedics/ >>, Sep. 27, 2010, pp. 2.

"Windows Automation API", Retrieved at http://msdn.microsoft.com/en-us/library/ff486375(v=VS.85).aspx >>, Nov. 10, 2010, pp. 2.

"Assistive Technology Service Provider Interface", Retrieved at << http://en.wikipedia.org/wiki/Assistive_Technology_Service_Provider_Interface >>, Jul. 27, 2010, p. 1.

"Accessibility Objects and the Accessibility Hierarchy", Retrieved at << http://developer.apple.com/library/mac/#documentation/Cocoa/Conceptual/Accessibility/cocoaAXOverview/cocoaAXOverview.html >>, Feb. 8, 2007, pp. 5.

* cited by examiner

ACCESSIBLE COMMANDING INTERFACE

BACKGROUND

The vast majority of users of computing devices interact with those computing devices through user input peripherals that are controlled by a user's hands; including, for example, the ubiquitous keyboard and mouse user input peripherals, as well as, more recently, touch-based peripherals such as trackpads, touch sensitive screens, and devices that can accept multi-touch input. Similarly, the vast majority of users of computing devices receive feedback from those computing devices through graphical user interfaces that are seen by the users. Certain individuals, who still desire to utilize and interact with computing devices, may not have the capability to utilize common input peripherals or to see commonly utilized graphical user interfaces. For example, those individuals who are blind cannot perceive a visually presented graphical user interface. Similarly, those individuals that have a physical handicap, such as damaged or missing arms and hands, cannot accurately utilize common input peripherals.

Traditionally, those users whose physical limitations prevent them from interacting with computing devices in a standard way have been able to interact with computing devices through specialized hardware and software designed to address those users' needs. For example, users who are blind, or who cannot otherwise accurately perceive a visually presented graphical user interface, can utilize a screen reader that can present content from a computing device, which would typically be displayed in a visual manner, instead in an auditory manner. Similarly, users having a physical handicap that prevents them from accurately utilizing common input peripherals, can instead utilize non-traditional input peripherals such as an eye tracker that can enable a user to control certain aspects of the computing device through movement of their eyes, or a so-called "sip-n-puff" device that can enable a user to control certain aspects of the computing device through the movement of their mouth or tongue.

The technology that enables users whose physical limitations prevent them from interacting with computing devices in a standard way to still be able to interact with those computing devices is commonly known as "assistive technology", and includes the above-mentioned screen readers, eye trackers, and other such devices. Unfortunately, as computing interfaces have become more complex, assistive technology has struggled to keep up. For example, due to more complex, and more capable, input peripherals, such as peripherals that can accept multi-touch input, modern computing user interfaces can, simply, comprise too much information to be meaningfully consumed through assistive technology such as a screen reader.

SUMMARY

In one embodiment, an accessible commanding interface can be presented that can enable a user to quickly identify and select appropriate functionality provided by the computing device with a minimum of input. The accessible commanding interface can interact with application programs, or the operating system, executing on a computing device and can obtain from them, a list of functions and functionality that is provided by, and offered by those application programs and operating systems. Consequently, the accessible commanding interface can enable users to interact with application programs, and the operating system, in terms of the tasks that a user wishes to accomplish, rather than the specific graphical user interface elements presented.

In another embodiment, the accessible commanding interface can provide a search functionality that can enable a user to search for a particular task that the user wishes to accomplish, or particular functions or functionality that the user is interested in. As the user provides information to the accessible commanding interface's search functionality, the accessible commanding interface can dynamically and continuously update a list of functions and functionality that match the users search query. The user can then select an appropriate element of that list to perform the associated function, thereby enabling a user to interact with a computing device with a minimum of steps.

In a further embodiment, the accessible commanding interface can provide filtering, or "scoping" functionality that can enable the user to filter the tasks or functions listed by the accessible commanding interface. Functions can be filtered based on their pattern, such as, for example, whether a function exposes a list, whether it establishes or modifies a value, whether it invokes additional processing, and other like patterns. Functions can also be filtered based on the types of user-performed activities for which such functions would be utilized.

In a still further embodiment, when the accessible commanding interface provides a list of functions and functionality, such as in response to a user query, the accessible commanding interface can prioritize such a listing so that the most relevant, or most likely to be selected functions and functionality are presented first. The accessible commanding interface can prioritize such a listing based on contextual data, including any search terms that were utilized to which such a listing is responsive, prior search terms, prior actions of the user, and a current context of the application program, such as, for example, what the user is currently doing within the application program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to a commanding interface that can provide a mechanism by which users that interact with computing devices through assistive technology can, in an efficient manner, utilize application programs, and the operating system, that are executing on such computing devices. The commanding interface can reduce the increasingly complex graphical user interface of application programs and operating systems to a more accessible list of functions and functionality, thereby enabling the user to focus not on a graphical user interface that such a user may not even be able to perceive in the normal manner, such as through sight, but rather enabling the user to focus on the tasks that the user seeks to accomplish through an accessible mechanism such as a screen reader. The commanding interface can provide a search mechanism that can enable a user to search for a particular function or functionality that can dynamically update results as the user's search query is entered. Additionally, the commanding interface can prioritize search results based on contextual data, such as prior search terms, prior actions, and the context of the user's current interaction with the computing device. The commanding interface can enable the user to filter, or "scope", the functions and functionality that the commanding interface provides in accordance with the types of user-performed activities for which such functions would be utilized.

The techniques described herein focus on a commanding interface that is illustrated and described with reference to a particular visual presentation. However, while such illustrations and descriptions are made for ease of reference, the techniques described herein are not so limited. In particular, the commanding interface is designed to make more efficient the interactions between a computing device and a user that is physically incapable of interacting with the computing device in a traditional manner, including visually perceiving the graphical user interface. Consequently, the exact presentation of the commanding interface can vary depending upon a user's capabilities with, for example, the commanding interface having no visual component for users who are blind, or, alternatively, the commanding interface having a more simplified visual component for users that must rely upon inefficient input peripherals, such as eye trackers or sip-n-puff devices. Therefore, the following illustrations and descriptions are meant to be illustrative only and are not meant to limit the below-described techniques to the specific visual implementations shown and described.

Although not required, the description below will be in the general context of instructions being executed by a device having computational abilities. Such "computing devices" include both traditional computers and consumer-electronic devices having computational abilities, such as those provided by a central processing unit. Thus, the description below will be in the general context of "computer-executable instructions," such as program modules, that are capable of being executed by such a "computing device." More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers and conventional personal electronics devices, and can include other devices capable of computation, including hand-held devices, multi-processor systems, other microprocessor based or programmable consumer electronics, network PCs, minicomputers, mainframe computers, and the like. Similarly, the computing devices need not be limited to a stand-alone device, as the mechanisms may also be practiced in distributed computing environments where tasks are performed by remote processing devices that are linked through a communications network. In a distributed computing environment, program modules may be located in both local and remote memory storage devices.

Figure 1:
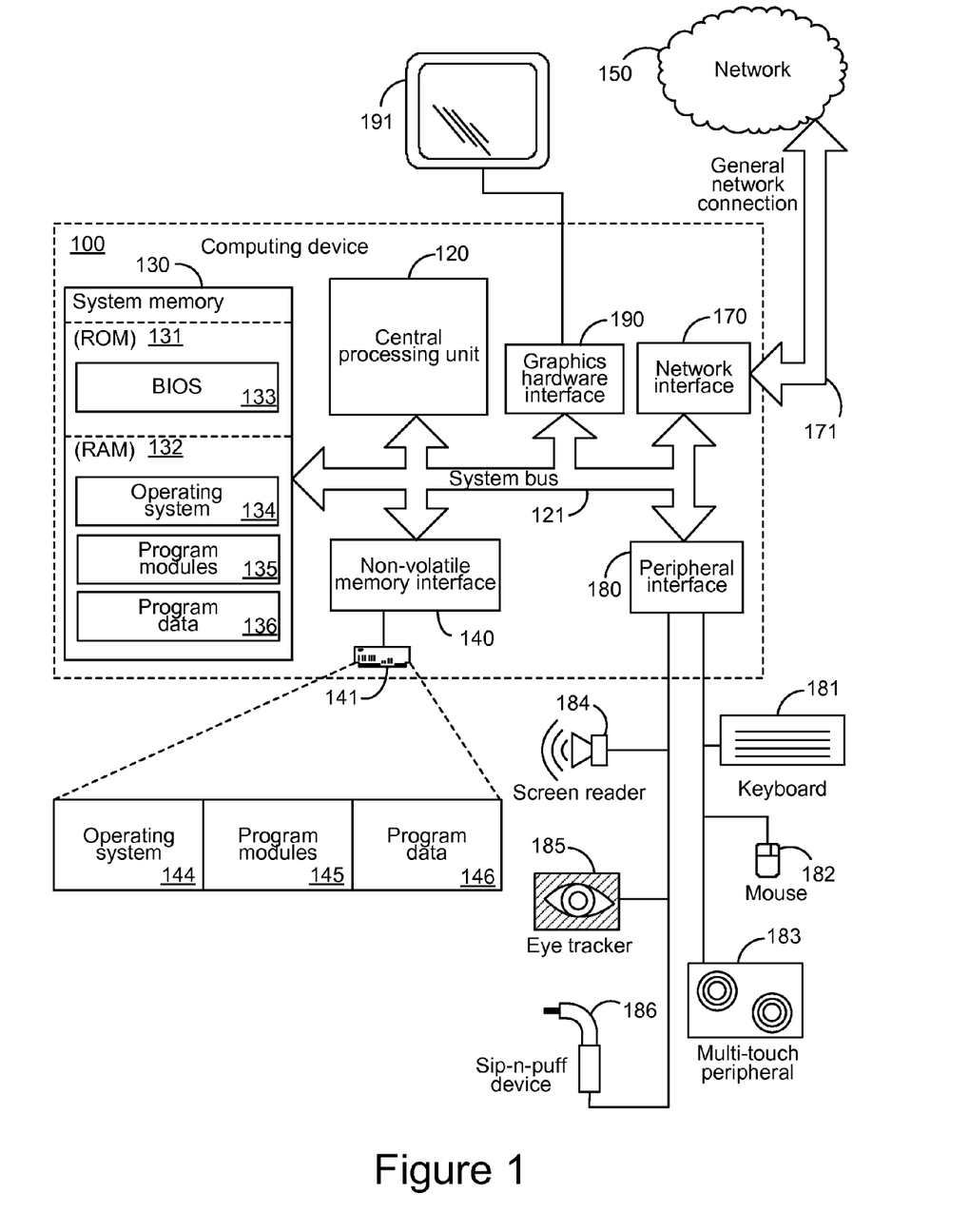
FIG. 1 is a diagram of an exemplary computing device with assistive technology.

With reference to FIG. 1, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can include peripherals that can enable a user to interact with the computing device. Such peripherals can include peripherals for presenting information from the computing device 100 to a user of such a computing device, and can include peripherals for enabling the user to provide information and instruction to the computing device 100. Peripherals that can enable the computing device 100 to present information to a user can comprise graphics hardware, including, but not limited to, a graphics hardware interface 190 and a display device 191 that can be utilized, by the computing device, to present visual, graphical user interfaces to the user. Additional peripherals that can enable the computing device 100 to present information to a user can also include assistive technology peripherals designed for users that are physically incapable of perceiving the traditional, visual, graphical information presented on the display device 191, such as users who are blind. Such assistive technology peripherals can include a screen reader 184, which can provide auditory information from the computing device 100 to a user of that computing device, as well as other like peripheral devices that are not explicitly shown in FIG. 1. Peripherals that can enable a user to provide information to the computing device 100 can include a mouse 182, a keyboard 181, a multi-touch peripheral 183, such as a trackpad, accessory tablet, or other like device, all of which can be utilized by a user to generate input to be provided to the computing device. Peripherals that can enable a user to provide information to the computing device 100 can also include assistive technology peripherals designed for users that are physically incapable of operating the keyboard 181, the mouse 182 or the multi-touch peripheral 183 in an efficient or capable manner. Such assistive technology peripherals can include an eye tracker 185 that can enable a user to provide input to the computing device 100 via their eye movements, a so-called "sip-n-puff" device 186 that can enable a user to provide input to the computing device 100 via movements of their mouth and/or tongue, a microphone for receiving speech input instructions and other like peripheral devices that are not explicitly shown in FIG. 1. The above-described peripheral devices can be communicationally coupled to the system bus 121 of the computing device 100 via a peripheral interface 180 and often include both hardware aspects and software aspects to enable their functionality. As such, while only their hardware representations are shown in FIG. 1, reference to such peripherals below is meant to include both the hardware and software for proper operation.

The computing device 100 also typically includes computer readable media, which can include any available media that can be accessed by computing device 100 and includes both volatile and nonvolatile media and removable and non-removable media. By way of example, and not limitation, computer readable media may comprise computer storage media, communication media or combinations thereof. Computer storage media includes media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through an interface such as non-volatile memory interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is not limited to any particular network or networking protocols. Thus, for simplicity of illustration, the computing device 100 is shown in FIG. 1 to be connected to a network 150 via a general network connection 171 that can be a local area network (LAN), a wide area network (WAN) or other networks. The computing device 100 is connected to the general network connection 171 through a network interface or adapter 170, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

As will be recognized by those skilled in the art, the assistive technology peripherals described above, and illustrated in FIG. 1, may not enable as efficient interaction with the computing device 100 as the more traditional peripherals, such as a keyboard 181, a mouse 182, and a graphical display 191. For example, a user having acceptable eyesight can quickly scan the graphical information that is visually presented on the display 191 to identify that information that is of interest to the user, such as, for example, specific windows, tools, entry boxes, or other like graphical user interface elements that are typically visually presented by the display 191. Conversely, a user that cannot see the display 191, such as a blind user, may need to rely on assistive technology, such as the screen reader 184, to interact with the computing device 100. Because the screen reader 184 vocalizes the graphical user interface elements that are visually presented by the display 191, it can take a blind user substantially longer to identify, by listening to the screen reader 184, the particular user interface element or information that is of interest to the user. Similarly, a user having acceptable control of their arms and hands can efficiently enter information, such as via the keyboard 181 or the multi-touch peripheral 183, and can efficiently utilize the mouse 182 to select one or more graphical user interface elements, all of which can enable such a user to efficiently instruct the computing device 100, and, more specifically the application programs or operating systems executing upon the computing device 100, to perform the functions desired by such a user. By contrast, a user that cannot properly control a mouse 182, a keyboard 181, or a multi-touch peripheral 183, may need to rely on assistive technology, such as the eye tracker 185 or the sip-n-puff device 186 to provide input to the computing device 100. Because an eye tracker, such as the eye tracker 185, and a sip-n-puff device, such as the sip-n-puff device 186, cannot be controlled as accurately as a mouse 182, or a multi-touch peripheral 183, and because they cannot provide for the same breadth of input as a keyboard 181, controlling the computing device 100 through such assistive technology peripherals can be substantially less efficient and more tedious than controlling the computing device 100 through more traditional peripherals.

Figure 2:
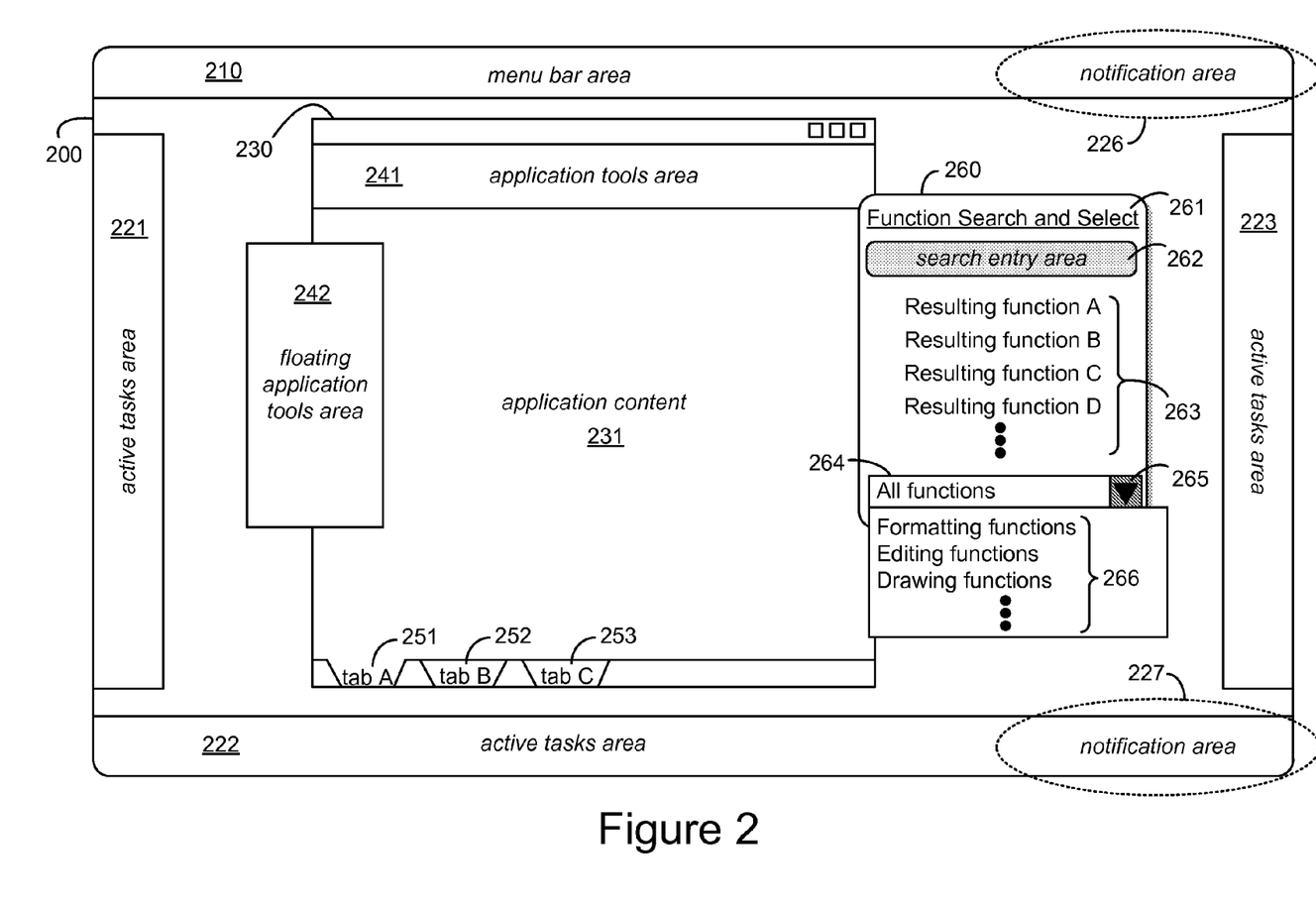
FIG. 2 is a diagram of a display comprising an exemplary commanding interface.

To enable users to utilize assistive technology peripherals to more efficiently interact with a computing device, especially within the context of modern software application programs and operating systems, whose user interfaces are increasingly complex, a commanding interface can be offered to the user that can focus, not on individual user interface elements, but rather on the tasks that an application program, or the operating system, is capable of performing. Turning to FIG. 2, the exemplary graphical user interface 200, such as could be displayed by the display device 191 shown in FIG. 1, illustrates one exemplary embodiment of such a commanding interface. As will be described in further detail below, the commanding interface 260, shown in the graphical user interface 200 of FIG. 2, can enable the user, especially a user interacting with the computing device through assistive technology, to more efficiently perform tasks then the user would otherwise be able to do by navigating the traditional user interfaces presented by application programs and the operating system.

As shown in the graphical user interface 200 of FIG. 2, an increasingly typical graphical user interface comprises a myriad of elements that can be difficult for users interacting with the computing device through assistive technology to navigate. For example, the graphical user interface 200 comprises a menu bar area 210 in which application programs or the operating system often present pull-down menu selection mechanisms by which a user can access at least some of the functionality offered by those application programs or the operating system. Additionally, the graphical user interface of FIG. 200 comprises active tasks areas 221, 222 and 223. Typically, such active tasks areas are maintained by an operating system and can comprise icons, or other indicators, of application programs that may currently be executing or which may be available for easy execution, such as by a single click. The menu bar area 210 and at least some of the active tasks areas, such as the active task area 222, can further comprise notification areas, such as the notification areas 226 and 227, respectively. The notification areas 226 and 227 can be maintained by either an operating system or one or more application programs, and can present status information to a user, such as a current date and time, a status of any batteries that may be part of the computing device, indications of updates that may be available, and other like information.

The graphical user interface 200 of FIG. 2 can also comprise one or more application program windows, such as the window 230. Within the window 230, the application program responsible for such a window can further display an application tools area 241 that can traditionally be positioned near the top of the window 230, or it can display a floating application tools area 242 that can be more freely movable around the graphical user interface 200. Both the application tools area 241 and the floating application tools area 242 can comprise icons, or other user interface elements, that can access and invoke functions provided by the application program responsible for the window 230. Additionally, some application programs can provide for tab functionality, such as that illustrated by the tabs 251, 252 and 253. More specifically, the application content 231 that is shown within the window 230 can be the content associated with the tab 251. Additional content, that is not currently displayed within the window 230, can be associated with the tabs 252 and 253 and can be displayed when a user selects one or more of those tabs.

As can be seen from the exemplary graphical user interface 200 of FIG. 2, the myriad of user interface elements that are present within the graphical user interface 200 can make such a graphical user interface difficult to consume by users that cannot perceive it visually, such as, for example, blind users. For example, a blind user would need to sit and listen to a screen reader aurally describe every one of the interface elements of the graphical user interface 200 in order to identify those elements that may be relevant to the task that that blind user is seeking to accomplish. Such a process can be very tedious, especially in dynamic situations where certain aspects of the graphical user interface 200 can change and respond to a user's prior action. For example, if the application program responsible for the window 230 is an e-mail program, then the icons displayed in the application tools area 241 may change depending on whether the application content 231 is directed to reviewing existing e-mails, composing a new e-mail, editing a user's calendar, adding a new contact, or other like activities, all of which can be supported by such an e-mail program.

Similarly, the intricate nature of the graphical user interface 200 of FIG. 2 can make it difficult for users that cannot properly control existing input peripherals to navigate around such a graphical user interface. For example, users relying on assistive technology peripherals may find it difficult to transition between invoking functionality accessed via the floating application tools area 242, invoking functionality accessed via menus in the menu bar area 210, and transitioning between application content, such as the application content 231, that can be associated with different tabs of the application program, such as the tabs 251, 252 and 253.

In one embodiment, therefore, a commanding interface, such as the exemplary commanding interface 260 shown in FIG. 2, can be provided to facilitate interaction between a user relying on assistive technology peripherals and a computing device executing an operating system and one or more application programs. For ease of subsequent descriptions, references below to application programs, or the functionality of application programs, are intended to likewise include operating systems and the functionality provided by operating systems. Additionally, while the descriptions below are provided in connection with FIG. 2, which illustrates a graphical user interface, such as would be visually displayed by the display device 191 shown in FIG. 1, the descriptions are intended to describe any user interface that, because of the commanding interface 260 described below, is more easily and more efficiently consumable by users. As such, the "presentation" of a user interface in general, or the commanding interface 260 specifically, is intended to include, not just traditional visual presentation, but also other forms of presentation such as would be presented by assistive technology. For example, a screen reader, such as the screen reader 164, shown in FIG. 1, can present the below-described commanding interface 260 in an aural manner. As will be recognized by those skilled in the art, and as explicitly described below, the commanding interface 260 described is specifically designed and organized to be able to be presented and consumed through assistive technology, such as a screen reader, in a more efficient manner.

The commanding interface 260 can comprise a title 261 that can describe the commanding interface in such a manner that users relying on assistive technology, such as, for example, screen readers, can easily recognize the commanding interface 260, and can easily select and invoke it. In one embodiment, the title itself could be updated dynamically to include information regarding the scope of the interface, such as, for example, a search term whose results are being displayed, such as in the manner described in detail below. Additionally, the commanding interface 260 can comprise a search entry area 262 into which users can enter search queries directed to the types of tasks they wish to perform. Thus, rather than attempting to navigate around the complex and intricate graphical user interface 200, a user can instead simply enter an appropriate search query in the search entry area 262. For example, if the user was utilizing the commanding interface 260 to interact with an e-mail application program, the user could enter a search query directed to "write a new email", rather than attempting to utilize something like an eye tracker, or a sip-n-puff device to navigate to the application tools area 241 and attempt to accurately select the icon associated with drafting a new e-mail.

In response to information entered into the search entry area 262, the commanding interface 260 can provide results, such as the results 263 shown in FIG. 2. The results provided by the commanding interface can be obtained, by the commanding interface, by searching through functions and functionality exported by the application program, or they can be obtained, again by the commanding interface, by polling the application program directly. The results 263 that are provided by the commanding interface 260 can comprise those functions and functionality offered by an application program that can be deemed to be responsive to the query entered by the user into the search entry area 262. Although illustrated in FIG. 2 in a textual manner, the results 263 can also comprise the actual application user interface elements, as presented by the application itself. In one embodiment, the results 263 can be dynamically updated, in real time, as the user enters information into the search entry area 262. More specifically, as will be recognized by those skilled in the art, many users relying on assistive technology cannot provide information quickly to a computing device. Consequently, while the user engages in the potentially tedious task of entering information, the commanding interface 260 can respond in a dynamic and real-time manner, updating the results 263 as, for example, each character is entered into the search entry area 262. Thus, rather than requiring the user to enter the entire string "write a new e-mail", the commanding interface 260 may have already returned the relevant function or functions in the results 263 by the time the user had only entered the characters "w", "r" and "i" into the search entry area 262.

In one embodiment, the order in which the results 263 are presented in the commanding interface 260 can be influenced by contextual factors, either independently or in combination with the search terms in response to which the results 263 are being presented. For example, the commanding interface 260 can take into account prior searches that the user may have performed, the current state of the application program, the activity the user is in the middle of performing with the application program, and other like contextual factors to attempt to determine which ones of the results 263 are more likely to be the results for which the user is searching. The commanding interface 260 can then display those results first, thereby enabling the user to select them more efficiently. Such can especially be true within the context of users utilizing assistive technology such as screen readers, because such screen readers would likely read all of the results until the user heard the result for which they were searching. Consequently, the closer the result that the user desires is to the beginning of the results list, the more quickly the screen reader will read it, and the more quickly the user can recognize it and select it.

Alternatively, or in addition, the commanding interface 260 can provide a filtering, or "scoping" mechanism, through which the user can limit the results 263 based upon the types of user-performed activities for which functions would be utilized. For example, as illustrated in the exemplary user interface 200 of FIG. 2, the commanding interface 260 can provide a scoping mechanism 264 that can enable users to limit the results 263 to particular kinds of functions. In one embodiment, the kinds of functions 266 can be displayed in a drop-down display that can be revealed via the selection mechanism 265 that can be part of the scoping mechanism 264. Thus, if a user were, for example, in the process of drafting an e-mail, they could utilize the scoping mechanism 264 to limit the results of 263 to only those functions relevant to the drafting of an e-mail, such as, for example, editing functions. Alternatively, as another example, the kinds of functions 266 can be based on the types of user-performed activities for which such functions would be utilized. Thus, in such an example, the list of functions 266 could read: "Reading a document", "Reading a web page", "Editing an email", and the like. As yet another example, the kinds of functions 266 can be based on the application program that exports, or provides for, those functions. Again, as indicated previously, such a scoping mechanism 264 can enable users that interact with computing devices through assistive functionality to more efficiently identify and select the functions and functionality exposed by application programs that those users seek to utilize or invoke.

Figure 3:
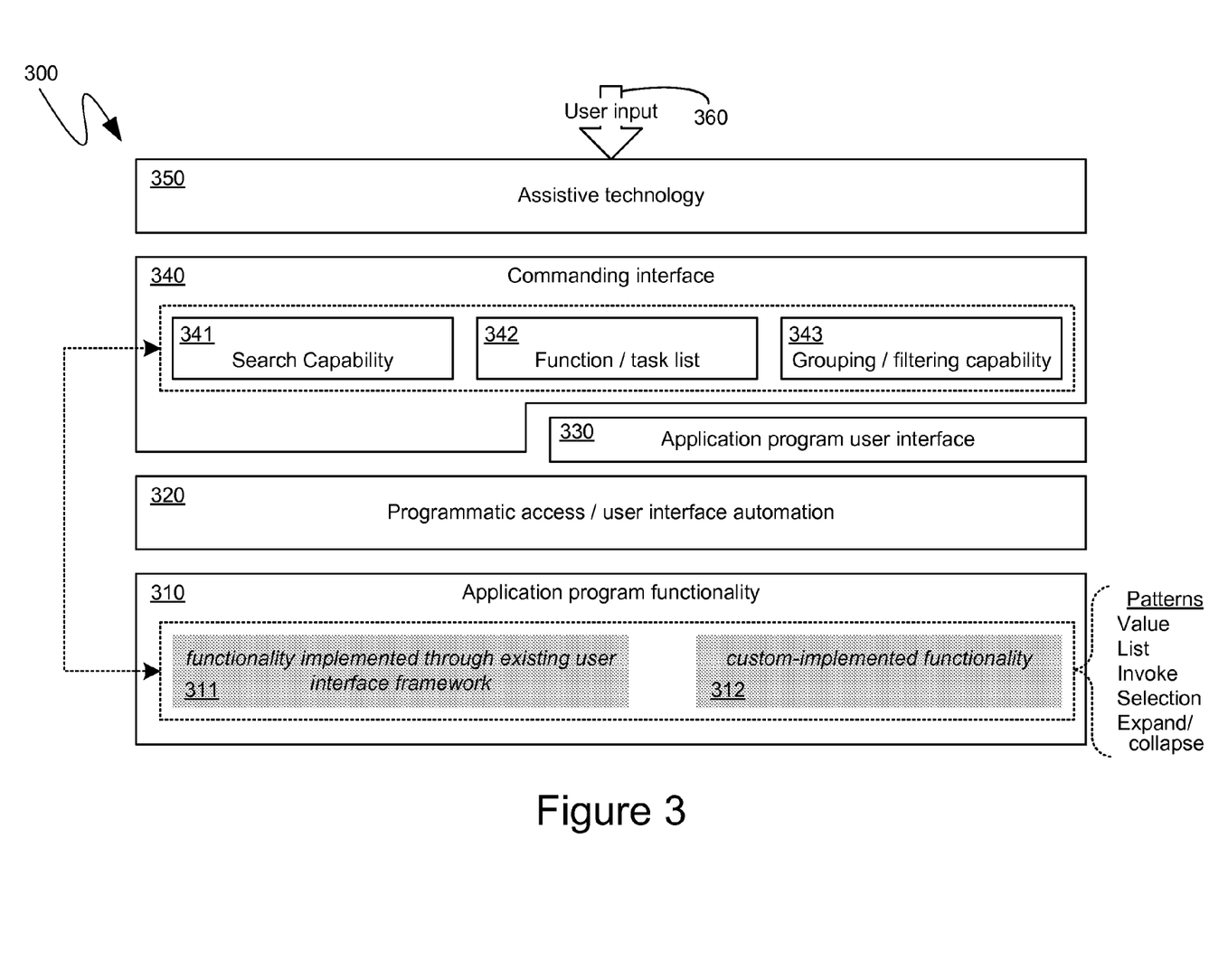
FIG. 3 is a block diagram of an integration of an exemplary commanding interface with an existing application program structure.

Turning to FIG. 3, the layer diagram 300 shown therein illustrates an exemplary interaction and integration between a commanding interface component 340, such as a commanding interface component that can display the commanding interface 260 shown in FIG. 2 and described above, and other components executing on a computing device. As shown in the layer diagram 300 of FIG. 3, the commanding interface component 340 can be layered on top of functionality provided by an application program, such as the application program functionality 310. Typically, modern operating systems provide for some sort of programmatic access or user interface automation component or layer 320 that can facilitate the export of the application program functionality 310 outside of the application program itself. For example, the programmatic access 320 can be utilized to generate scripts or macros that can invoke certain functions or functionality of an application program but can execute on a computing device independently of that application program.

Broadly, the application program functionality 310 can comprise functionality 311 that is implemented through existing user interface frameworks and custom implemented functionality 312. For example, application program user interface elements that were programmed by positioning pre-created templates on an application program user interface mockup can be among the functionality 311 that is implemented through existing user interface frameworks. Such functionality 311 can already have built-in the relevant programmatic access, such as would be made accessible through the programmatic access layer 320. Conversely, custom implemented functionality 312 can require that the programmer of the application program provide programmatic access to enable, for example, the commanding interface component 340 to provide access to such custom implemented functionality 312. Thus, the custom implemented functionality 312 can be any functionality that an application provides that is not provided directly by the functionality 311.

In one embodiment, the commanding interface component 340 can interact with the programmatic access layer 320, and even the application program user interface 330, to provide access to the application program functionality 310 in a manner that is more easily consumed, such as by the assistive technology 350 to which the user will be providing their user input 360, such as is illustrated by the block diagram 300 of FIG. 3. As indicated previously, the commanding interface component 340 can comprise a search capability 341, a function or task list 342 and grouping or filtering capability 343. Such aspects of the commanding interface 340 can be informed by the application program functionality 310, as illustrated by the dashed lines shown in the block diagram 300 of FIG. 3. More specifically, the commanding interface component 340 can communicate with an application program to obtain a listing of, or information about, the application program functionality 310 provided by such an application program. The information obtained by the commanding interface component 340 can be part of the function or task list 342 that can be maintained by the commanding interface 340. Such a list 342 can then be referenced by the search capability 341 to enable the commanding interface to provide, to a user, the ability to search for specific tasks that the user wishes to accomplish or specific functions that the user wishes to invoke.

Additionally, the function or task list 342 can be utilized by the grouping or filtering capability 343 to identify particular groupings or categories of functions or functionality. More specifically, as will be understood by those skilled in the art, specific functions from among the application program functionality 310 can conform to particular "patterns". For example, certain ones of the application program functionality 310 can conform to a value pattern in that the functionality provides for, or is informed by, values that can be obtained, such as from a user, or from other processes. Other ones of the application program functionality 310 can conform to a list pattern in that the functionality provides for, or exposes, a list of alternatives that can be, for example, selected by a user. Still other ones of the application program functionality 310 can conform to and invoke pattern where the functionality performs an action when it is invoked by a user. Other ones of the application program functionality 310 can conform to other patterns, such as a selection pattern or an expand/collapse pattern, as generally illustrated by the block diagram 300 of FIG. 3.

Typically, the classification of specific ones of the application program functionality 310 into one or more patterns, such as the patterns described above, can be performed by the programmer of the application program. In one embodiment, therefore, the grouping or filtering capability 343 can coordinate the obtaining of application program functionality 310 by the commanding interface component 340, rather than referencing the function or task list 342. More specifically, in one embodiment, the commanding interface 340, rather than querying an application program for a complete set of the application program functionality 310, can, with the assistance of the grouping or filtering capability 343, only query the application program for a specific subset of functionality, such as functionality that conforms to one or more patterns. The grouping or filtering capability 343 can, additionally, act as an arbiter of "importance", such that more relevant, or otherwise more "important" functionality is more prominently presented to the user.

The commanding interface component 340 can continually be in communication with the application program and can continually obtain some or all of the application program functionality 310 for ultimate presentation to the user, such as in the manner described in detail above.

Figure 4:
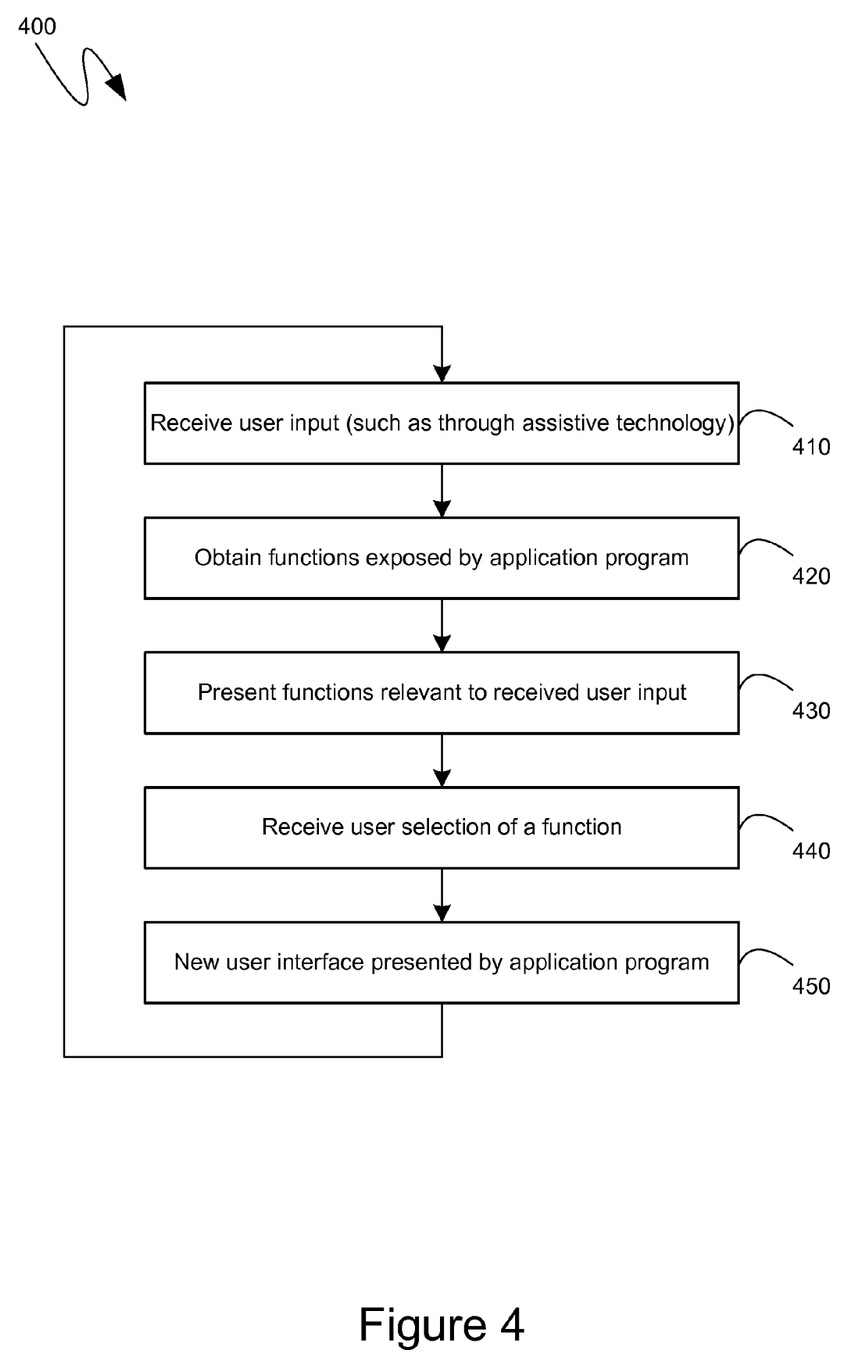
FIG. 4 is a flow diagram of an exemplary operation of a commanding interface.

Turning to FIG. 4, the flow diagram 400 shown therein illustrates an exemplary series of steps that can be performed by a commanding interface component 340, or other component, such as an operating system, that can provide for commanding interface functionality, such as that described in detail above. As shown, at step 410, the commanding interface can receive user input, such as user input received through assistive technology peripherals. For example, in one embodiment, the user can utilize the assistive technology peripherals to initially invoke the commanding interface, and then subsequently provide user input directed to such a commanding interface. As will be recognized by those skilled in the art, the above-described commanding interface need not be presented by any specific application program, but can, instead, be presented independently of application programs, such as a commanding interface that can be invoked by a user via whatever assistive technology peripherals the user can utilize.

Subsequently, once the commanding interface has been invoked, the commanding interface can, at step 420, obtain information regarding some or all of the functions or functionality exposed by, or provided by, an application program. In one embodiment, at step 420, the commanding interface can obtain information regarding only a subset of the functions or functionality exposed by, or provided by, the application program, namely the subset identified by the user input received at step 410. More specifically, at step 420, the commanding interface can request, and then receive, only those functions that can be relevant to the user input received at step 410.

Once the commanding interface has received information regarding the functions provided by an application program, the commanding interface can, at step 430, present the functions that are relevant to the user input received at step 410. For example, in one embodiment, the user input received at step 410 can be at least an initial portion of a search query, such as a search query directed to a task that the user wishes to perform utilizing the application program. In such an example, the functions presented at step 430, by the commanding interface, can be those functions that correspond to, or are responsive to, the search query. In one embodiment, as indicated previously, the functions presented at step 430 can be ordered in accordance to their perceived relevance to the user, given the context within which the user's input was received at step 410. Such context can include prior searches, or other prior input provided by the user, the user's current interactions with the application program, and the task that the user is currently engaged in performing with the application program.

Alternatively, or in addition, the functions presented by the commanding interface, at step 430, can be grouped into a hierarchy for easier navigation by the user. For example, the functions presented at step 430 can be grouped in accordance with the patterns supported by those functions, as indicated by the information received at step 420 from the application program. As another example, the functions presented at step 430 can be grouped in accordance with heuristics that can be performed by the commanding interface component to identify similar functions, complementary functions, or functions that should otherwise be associated with one another, such as functions that are more relevant to the user in the user's current context.

At step 440, the user can select one of the functions presented at step 430, and the commanding interface can receive the users selection and can, thereby, appropriately instruct the application program. For example, if the function selected by the user at step 440 was one directed to the creation of a new e-mail in an e-mail application program, the commanding interface can pass along such an instruction to the e-mail application program, thereby causing the creation of the new e-mail. At step 450, the application program can generate a new user interface in response to the instructions received at step 440. For example, an e-mail application program can generate a new interface directed to the composition of a new e-mail once the new e-mail creation function was involved. Processing can then return to step 410, where the user can again direct input to the commanding interface so as to accomplish the next task that the user desires to perform with the application program. In such a manner, a commanding interface can enable a user to interact with an application program in an efficient manner despite the inherent inefficiencies of assistive technology and the user's physical limitations.

As can be seen from the above descriptions, mechanisms for providing a commanding interface to simplify users' interactions with application programs have been presented. In view of the many possible variations of the subject matter described herein, we claim as our invention all such embodiments as may come within the scope of the following claims and equivalents thereto.

We claim:

1. One or more computer-readable storage media comprising computer-executable instructions for enabling a user to interact with an independently-executable computer application program, the computer-executable instructions directed to steps comprising:

obtaining, from the computer application program, information regarding functions currently made available to the user by the computer application program through a computer application program user interface that is presented by the computer application program;

generating a commanding interface that is different than the computer application program user interface and through which the user can interact with the computer application program independently of the computer application program user interface;

presenting the commanding interface to the user independently of the computer application program user interface;

receiving, from the user, at least a portion of a search query via the commanding interface;

searching the obtained information for at least one function that is responsive to the at least the portion of the search query;

presenting, to the user, through the commanding interface, the at least one function that was responsive to the at least the portion of the search query;

receiving, from the user, through the second user interface, a selection of the at least one function;

generating an instruction to the computer application program to perform the at least one function; and enabling the user to interact with the computer application program through the commanding interface by performing the obtaining, the generating and the presenting a subsequent time after the computer application program performs the at least one function.

2. The computer-readable storage media of claim 1, comprising further computer-executable instructions directed to:

receiving, from the user, after the portion of the search query, a subsequent portion of the search query via the commanding interface;

searching the obtained information for at least one function that is responsive to a concatenation of the portion and the subsequent portion of the search query; and presenting, to the user, through the commanding interface, the at least one function that was responsive to the concatenation of the portion and the subsequent portion of the search query while the user is continuing to enter further subsequent portions of the search query.

3. The computer-readable storage media of claim 1, comprising further computer-executable instructions for: determining a context within which the search query is being made; and prioritizing the presentation of the at least one function that was responsive to the at least the portion of the search query in accordance with the context.

4. The computer-readable storage media of claim 1, comprising further computer-executable instructions directed to:

generating a scoping mechanism for filtering the functions made available to the user by the computer application program;

receiving, from the user, a scoping selection via the scoping mechanism; and filtering the presentation of the at least one function that was responsive to the at least the portion of the search query to retain only that functionality associated with the scoping selection.

5. The computer-readable storage media of claim 4, wherein the scoping mechanism lists patterns of the functions made available to the user by the computer application program as identified by the obtained information.

6. The computer-readable storage media of claim 4, comprising further computer-executable instructions for heuristically analyzing the functions made available to the user by the computer application program to identify groups of associated functions; and wherein the scoping mechanism lists the identified groups.

7. The computer-readable storage media of claim 1, comprising further computer-executable instructions for querying the computer application program for the information regarding the functions made available to the user by the computer application program.

8. The computer-readable storage media of 1, wherein the computer-executable instructions for presenting the commanding interface to the user comprise computer-executable instructions for presenting user interface elements in an aural manner with a screen reader communicationally coupled to the computing device executing the computer application program.

9. A method of enabling a user to interact with an independently-executable computer application program, the method comprising the steps of:

obtaining, from the computer application program, information regarding functions currently made available to the user by the computer application program through a computer application program user interface that is presented by the computer application program;

generating a commanding interface that is different than the computer application program user interface and through which the user can interact with the computer application program independently of the computer application program user interface;

presenting the commanding interface to the user independently of the computer application program user interface;

receiving, from the user, at least a portion of a search query via the commanding interface;

searching the obtained information for at least one function that is responsive to the at least the portion of the search query;

presenting, to the user, through the commanding interface, the at least one function that was responsive to the at least the portion of the search query;

receiving, from the user, through the second user interface, a selection of the at least one function;

generating an instruction to the computer application program to perform the at least one function; and enabling the user to interact with the computer application program through the commanding interface by performing the obtaining, the generating and the presenting a subsequent time after the computer application program performs the at least one function.

10. The method of claim 9, further comprising the steps of:

receiving, from the user, after the portion of the search query, a subsequent portion of the search query via the commanding interface;

searching the obtained information for at least one function that is responsive to a concatenation of the portion and the subsequent portion of the search query; and presenting, to the user, through the commanding interface, the at least one function that was responsive to the concatenation of the portion and the subsequent portion of the search query while the user is continuing to enter further subsequent portions of the search query.

11. The method of claim 9, further comprising the steps of:

determining a context within which the search query is being made; and prioritizing the presentation of the at least one function that was responsive to the at least the portion of the search query in accordance with the context.

12. The method of claim 9, further comprising the steps of:

generating a scoping mechanism for filtering the functions made available to the user by the computer application program;

receiving, from the user, a scoping selection via the scoping mechanism; and filtering the presentation of the at least one function that was responsive to the at least the portion of the search query to retain only that functionality associated with the scoping selection.

13. The method of claim 12, wherein the scoping mechanism lists patterns of the functions made available to the user by the computer application program as identified by the obtained information.

14. The method of claim 12, further comprising the step of heuristically analyzing the functions made available to the user by the computer application program to identify groups of associated functions; and wherein the scoping mechanism lists the identified groups.

15. The method of claim 9, further comprising the step of querying the computer application program for the information regarding the at least two functions made available to users by the computer application program.

16. The method of claim 9, wherein the presenting the commanding interface to the user comprises presenting user interface elements in an aural manner with a screen reader communicationally coupled to the computing device executing the computer application program.

17. A system comprising:
at least one of: a screen reader, an eye tracker or a sip-n-puff device; and
a computing device communicationally coupled to the at least one of: the screen reader, the eye tracker or the sip-n-puff device, the computing device comprising: a computer application program and computer-executable instructions, executing independently of the computer application program, the computer-executable instructions directed to steps comprising:
generating a commanding interface that is different than the computer application program user interface and through which a user can interact with the computer application program independently of a computer application program user interface that is presented by the computer application program, the commanding interface being independent of the computer application program user interface;
receiving, from the user, a selection, through the commanding interface, of at least one function of the computer application program, the at least one function having been presented to the user through the commanding interface;
generating an instruction to the computer application program to perform the at least one function; and
enabling the user to interact with the computer program through the commanding interface by performing the generating a subsequent time after the computer application program performs the at east one function.

18. The system of claim 17, wherein the computing device further comprises computer-executable instructions for: presenting the commanding interface to the user in an aural manner with the screen reader.

19. The system of claim 17, wherein the computing device further comprises computer-executable instructions for:
receiving, from the user, at least a portion of a search query via the commanding interface;
searching the functionality of the computer application program to identify the at least one function of the computer application program, the at least one function being responsive to the at least the portion of the search query; and
presenting, to the user, through the commanding interface, the at least one function.

20. The system of claim 19, wherein the computing device further comprises computer-executable instructions for: determining a context within which the search query is being made; and prioritizing the presentation of the at least one function that was responsive to the at least the portion of the search query in accordance with the context.

\* \* \* \* \*